(12) United States Patent
Monoi et al.

(10) Patent No.: US 6,646,069 B2
(45) Date of Patent: Nov. 11, 2003

(54) ETHYLENE POLYMERS AND METHOD FOR PRODUCING THE SAME

(75) Inventors: Takashi Monoi, Kanagawa (JP); Hidenobu Torigoe, Kanagawa (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 174 days.

(21) Appl. No.: 09/899,102

(22) Filed: Jul. 6, 2001

(65) Prior Publication Data
US 2002/0042482 A1 Apr. 11, 2002

(30) Foreign Application Priority Data

Jul. 7, 2000 (JP) .......................................... 2000-207384

(51) Int. Cl.[7] .................................................. C08F 4/69
(52) U.S. Cl. ........................ 526/105; 526/106; 526/169; 502/117
(58) Field of Search ................................ 526/106, 105, 526/169

(56) References Cited

FOREIGN PATENT DOCUMENTS

| DE | 26 22 755 A1 | | 12/1977 |
| DE | 2622755 | * | 12/1977 |
| JP | 2000 086718 A | | 3/2000 |
| JP | 2000-198811 A | | 7/2000 |
| JP | 2000-273116 A | | 10/2000 |

OTHER PUBLICATIONS

Database WPI, Section Ch, Week 198318, Derwent Publications, Ltd., London, GB, AN 1983–42523K, XPOO2181290, JP 58 049708 A, (abstract), Mitsubishi Chem Ind Ltd, Mar. 24, 1983.

* cited by examiner

*Primary Examiner*—David W. Wu
*Assistant Examiner*—R. Rabago
(74) *Attorney, Agent, or Firm*—Sughrue Mion, PLLC

(57) ABSTRACT

The invention relates to a method for producing an ethylene polymer, comprising performing polymerization of ethylene in co-presence of hydrogen using a trialkylaluminum compound-carried chromium catalyst, wherein the chromium catalyst is obtained by calcination-activating a chromium compound that is carried on an inorganic oxide carrier in a non-reducing atmosphere to convert chromium atoms in the chromium compound into hexavalent chromium atoms for at least a portion thereof, and treating with a trialkylaluminum compound in an inert hydrocarbon solvent to carry thereon and removing to dry the solvent so that the chromium atoms are not over-reduced by the trialkylaluminum compound, and to an ethylene polymer suitable for blow molded articles obtained by the production method. The ethylene polymer of the invention have improved environment stress crack resistance (ESCR) and impact resistance in a good balance and are suitable for molded blow articles, in particular large size blow molded articles.

13 Claims, 1 Drawing Sheet

ETHYLENE POLYMERS AND METHOD FOR PRODUCING THE SAME

TECHNICAL FIELD

The present invention relates to a method for producing an ethylene polymer. More particularly, the present invention relates to a method for producing an ethylene polymer that performs polymerization of ethylene in the presence of hydrogen using a catalyst comprising a chromium catalyst having carried thereon a trialkylaluminum compound.

The ethylene polymer obtained by the method of the present invention is excellent in both environment stress crack resistance (hereinafter, sometimes abbreviated as ESCR) and impact resistance and is suitable for blow molded articles, in particular large blow molded articles.

RELATED ART

Ethylene polymers have been used generally and widely as resin materials for various molded articles and are required of different properties depending on the molding method and purpose.

For example, polymers having relatively low molecular weights and narrow molecular weight distributions are suitable for articles molded by an injection molding method. On the other hand, polymers having relatively high molecular weights and broad molecular weight distributions are suitable for articles molded by blow molding or inflation molding.

It has been hitherto known that ethylene polymers having broad molecular weight distributions suitable for blow molding, in particular large size blow molding, can be obtained by use of a chromium catalyst obtained by calcining a chromium compound carried on an inorganic oxide carrier in a non-reducing atmosphere to activate it such that at least a portion of the carried chromium atoms is converted to hexavalent chromium atoms (so-called Phillips catalyst).

However, in recent years, further improvement in quality is desired for ethylene polymers suitable for large size blow molded articles such as a plastic fuel tank and a large size drum. When an ethylene polymer having a broad molecular weight distribution obtained by using a conventional chromium catalyst is blow molded, the molded article does not have a satisfactory balance between ESCR and impact resistance and the demand of customers who desire molded articles excellent in the both properties cannot be satisfied sufficiently.

As a method for obtaining ethylene polymers by using the Phillips catalyst and an organoaluminum compound in combination, there has been disclosed a method for obtaining a polyethylene having excellent ESCR by supplying trialkylaluminum to the reaction system upon polymerization with the Phillips catalyst and performing the polymerization in the co-presence of hydrogen (Examined Japanese Patent Publication No. Sho 49-34759). However, this publication fails to disclose a trialkylaluminum-carried catalyst and a method for obtaining a polymer that has both high ESCR and high impact resistance in good balance, in which the polymerization activity is high.

In addition, methods for obtaining ethylene polymers using catalysts comprising the Phillips catalyst and a trialkylaluminum are disclosed in Examined Japanese Patent Publication Nos. Sho 36-22144 and Sho 47-23668 (U.S. patent application Ser. No. 766,625 filed in 1968). However, these publications fail to disclose a method for obtaining a polymer that has both improved ESCR and improved impact resistance.

SUMMARY OF THE INVENTION

Therefore, an object of the present invention is to overcome the problems mentioned above and provide a method for continuously producing an ethylene polymer that has both high environment stress crack resistance (ESCR) and high impact resistance in good balance, suitable for blow molded articles, in particular large size blow molded articles.

The present inventors have made extensive study in view of the above problems and have found that an ethylene polymer that is excellent in both ESCR and impact resistance in good balance by performing polymerization of ethylene in co-presence of hydrogen using a catalyst obtained by having a trialkylaluminum compound carried on a calcination-activated chromium catalyst in an inert hydrocarbon solvent and then removing the solvent followed by drying.

More particularly, the present invention has solved the problems mentioned above by developing the methods for producing an ethylene polymer according to (1) to (7) below and ethylene polymers according to (8) to (10) below.

(1) A method for producing an ethylene polymer, comprising performing polymerization of ethylene in co-presence of hydrogen using a trialkylaluminum compound-carried chromium catalyst, wherein the chromium catalyst is obtained by calcination-activating a chromium compound that is carried on an inorganic oxide carrier in a non-reducing atmosphere to convert chromium atoms in the chromium compound into hexavalent chromium atoms for at least a portion thereof, and treating with a trialkylaluminum compound in an inert hydrocarbon solvent to carry thereon and removing to dry the solvent so that the chromium atoms are not over-reduced by the trialkylaluminum compound.

(2) A method for producing an ethylene polymer, comprising performing polymerization of ethylene in co-presence of hydrogen using a trialkylaluminum compound-carried chromium catalyst, wherein the chromium catalyst is obtained by calcination-activating a chromium compound that is carried on an inorganic oxide carrier in a non-reducing atmosphere to convert chromium atoms in the chromium compound into hexavalent chromium atoms for at least a portion thereof, and treating with a trialkylaluminum compound in an inert hydrocarbon solvent to carry thereon and removing to dry the solvent so that a time in which the chromium compound contacts the solvent is minimized.

(3) The method for producing an ethylene polymer according to (1) or (2) above, wherein the inert hydrocarbon solvent is removed and dried in a time within 3 folds a time in which the carrying reaction of trialkylaluminum compound in the inert hydrocarbon solvent is performed.

(4) The method for producing an ethylene polymer according to (1) or (2) above, wherein the chromium compound-carried inorganic oxide carrier after the calcination-activation has a specific surface area of 350 m$^2$/g or more.

(5) The method for producing an ethylene polymer according to (1) or (2) above, wherein the trialkylaluminum compound-carried chromium catalyst has a molar ratio of the trialkylaluminum compound to the chromium atom of 0.5 to 10.

(6) The method for producing an ethylene polymer according to (1) or (2) above, wherein the polymerization is performed in a liquid phase under the condition under which a ratio of hydrogen concentration (Hc; mass %) to ethylene concentration (ETc; mass %) in the liquid phase satisfies the following formula:

$$1.0 \times 10^{-6} \leq Hc/ETc \leq 1.0 \times 10^{-2}.$$

(7) The method for producing an ethylene polymer according to (1) or (2) above, wherein the polymerization is performed in a gas phase under the condition under which a ratio of partial pressure of hydrogen (Hp; MPa) to ethylene partial pressure (ETp; MPa) in the gas phase satisfies the following formula:

$$1.0 \times 10^{-4} \leq Hp/ETp \leq 1.0.$$

(8) An ethylene polymer obtained by the method for producing an ethylene polymer according to (1) or (2) above and having an HLMFR of 0.1 to 1000 g/10 minutes and a density of 0.900 to 0.980 g/cm$^3$.

(9) The ethylene polymer according to (8) above, wherein the ethylene polymer is used for blow molded articles and has an HLMFR of 1 to 100 g/10 minutes and a density of 0.935 to 0.960 g/cm$^3$.

(10) The ethylene polymer according to (8) above, wherein the ethylene polymer is used for large size blow molded articles and has an HLMFR of 1 to 15 g/10 minutes and a density of 0.940 to 0.955 g/cm$^3$.

DETAILED DESCRIPTION OF THE INVENTION

Figure 1:
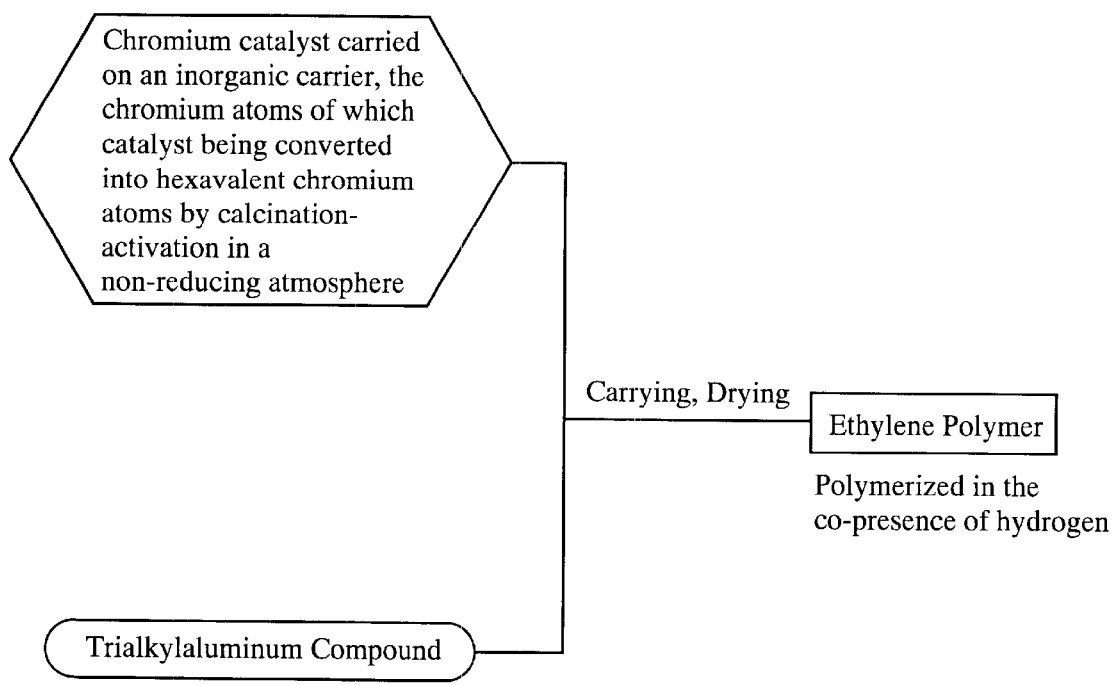
FIG. 1 is a flow chart for preparing the catalyst for producing ethylene polymer used in the present invention.

Hereinafter, the present invention will be described concretely.

The chromium catalyst obtained by whose chromium atoms for at least a portion thereof become hexavalent chromium atoms by having a chromium compound carried on an inorganic oxide carrier and calcination-activating it in an inert hydrocarbon solvent is generally known as the Phillips catalyst. The catalyst is outlined in M. P. McDaniel, Advances in Catalysis, Volume 33, p. 47, 1985, Academic Press Inc.; M. P. McDaniel, Handbook of Heterogeneous Catalysis, p. 2400, 1997, VCH; M. B. Welch et al., Handbook of Polyolefins: Synthesis and Properties, p. 21, 1993, Marcel Dekker; and the like.

The inorganic oxide carrier includes preferably oxides of metals of Groups 2, 4, 13 and 14 in the periodic table. Specific examples thereof include magnesia, titania, zirconia, alumina, silica, thoria, silica-titania, silica-zirconia, silica-alumina, and mixtures thereof. Among these, silica, silica-titania, silica-zirconia and silica-alumina are preferred. In the case of silica-titania, silica-zirconia and silica-alumina, those that contain titanium, zirconium or aluminum atom in an amount of 0.2 to 10%, preferably 0.5 to 7%, more preferably 1 to 5% as a metal component other than silica are used. The production method, physical properties and characteristics of the carriers suitable for the chromium catalyst are described in the literature, for example, C. E. Marsden, Preparation of Catalysts, Volume V, p. 215, 1991, Elsevier Science Publishers, C. E. Marsden, Plastics, Rubber and Composites Processing and Applications, Volume 21, p. 193, 1994, and so on.

In the present invention, it is preferred that the carrier be selected so that the chromium catalyst has a specific surface area of 350 m$^2$/g or more, preferably 370 m$^2$/g or more, and more preferably 400 m$^2$/g or more after the calcination-activation in a non-reducing atmosphere as described hereinbelow. If the specific surface area is less than 350 m$^2$/g, the ethylene polymerization activity of the catalyst tends to be more readily decreased according as the ratio of the carried trialkylaluminum compound to chromium atom increases. Also, if the molar ratio is too high, the molecular weight distribution of the resulting ethylene polymer is broad, so that although ESCR is improved, the impact resistance of the ethylene polymer decreases to aggravate the balance between ESCR and impact resistance. The upper limit value of the specific surface area of the chromium catalyst is not particularly limited but usually it is 1,000 m$^2$/g or less.

The pore volume of the carrier used in the present invention is the same as that of carriers used for common chromium catalysts, that is, in the range of 0.5 to 3.0 cm$^3$/g, preferably 0.7 to 2.7 cm$^3$/g, and more preferably 1.0 to 2.5 cm$^3$/g.

The mean particle size of the carrier is the same as that of carriers used for common chromium catalysts, that is, in the range of 10 to 200 μm, preferably 20 to 150 μm, and more preferably 30 to 100 μm.

A chromium compound is carried on the inorganic oxide carrier mentioned above.

The chromium compound may be any compound as far as the chromium atoms thereof are converted into hexavalent chromium atoms for at least a portion thereof by calcination-activating in a non-reducing atmosphere. Examples include chromium oxide, halides, oxyhalides, chromic acid salts, bichromic acid salts, nitric acid salts, carboxylic acid salts, and sulfuric acid salts of chromium, chromium-1,3-diketo compounds, chromic acid esters, and the like. Specific examples thereof include chromium trioxide, chromium trichloride, chromyl chloride, potassium chromate, ammonium chromate, potassium bichromate, chromium nitrate, chromium sulfate, chromium acetate, chromium tris(2-ethyl hexanoate), chromium acetylacetonate, bis(tert-butyl) chromate, and the like. Among these, chromium trioxide, chromium acetate and chromium acetylacetonate are preferred. In the case where the chromium compounds having an organic group such as chromium acetate and chromium acetylacetonate are used, the organic group moiety is burned by the calcination-activation in a non-reducing atmosphere as described hereinbelow and finally the chromium compound reacts with the hydroxyl group on the surface of the inorganic oxide carrier in the same manner as in the case where chromium trioxide is used and the chromium atoms of the catalyst are converted into hexavalent chromium atoms for at least a portion thereof so as to be fixed to the carrier through the structure of chromic acid ester as is known in the art (V. J. Ruddick et al., J. Phys. Chem., Volume 100, p. 11062, 1996; S. M. Augustine et al., J. Catal., Volume 161, p. 641, 1996).

The carrying of the chromium compound on the inorganic oxide carrier can be performed by impregnation, solvent removal, sublimation and the like known methods and any suitable method may be selected depending on the type of the chromium compound used. The amount of carried chromium compound is 0.2 to 2.0%, preferably 0.3 to 1.7%, and more preferably 0.5 to 1.5% in terms of chromium atom based on the carrier.

After the carrying, the chromium compound-carried carrier is calcined to effect activation treatment. The calcination-activation treatment can be performed in a non-reducing atmosphere that contains substantially no moisture, for example, under oxygen or air. In this case, an inert gas may be co-present. Preferably, the treatment is carried out under a flowing condition by using sufficiently dry air after passing through molecular sieves or the like. The calcination-activation is performed at 400 to 900° C., preferably 450 to 850° C., and more preferably 500 to 800° C., for 30 minutes to 48 hours, preferably 1 to 24 hours, and more preferably 2 to 12 hours. The calcination oxidizes the chromium atoms of the chromium compound carried on the inorganic oxide carrier into hexavalent chromium atoms for at least a portion thereof so as to be chemically fixed to the carrier.

By the above procedure, the chromium catalyst used in the present invention is obtained. In the present invention, before the calcination-activation and before or after the carrying of the chromium compound, a known method can be used for adjusting ethylene polymerization activity, copolymerizability with α-olefin, the molecular weight or molecular weight distribution of the resultant ethylene polymer by adding metal alkoxides or organometal compounds, typically titanium alkoxides such as titanium tetraisopropoxide, zirconium alkoxides such as zirconium tetrabutoxide, aluminum alkoxides such as aluminum tributoxide, organoaluminums such as trialkylaluminums, organomagnesiums such as dialkylmagnesiums, or fluorine-containing salts such as ammonium fluorosilicate.

The organic group moieties of the metal alkoxides or organometal compounds are burned by the calcination-activation in a non-reducing atmosphere and oxidized into a metal oxide such as titania, zirconia, alumina or magnesia and contained in the catalyst. In the case of fluorine-containing salts, the inorganic oxide carrier is fluorinated.

These methods are described in the literature such as C. E. Marsden, Plastics, Rubber and Composites Processing and Applications, Volume 21, p. 193, 1994; T. Pullukat et al., J. Polym. Sci., Polym. Chem. Ed., Volume 18, p. 2857, 1980; M. P. McDaniel et al., J. Catal., Volume 82, p. 118, 1983; and so on.

In the present invention, a trialkylaluminum compound is carried on the calcination-activated chromium catalyst in an inert hydrocarbon solvent and then the solvent is removed and dried so that the catalyst can be used as a trialkylaluminum compound-carried chromium catalyst.

The trialkylaluminum is a compound of the formula (1)

$$R^1R^2R^3Al \qquad (1)$$

wherein $R^1$, $R^2$ and $R^3$, which may be the same or different, independently represent an alkyl group having 1 to 18 carbon atoms.

Specific examples thereof include preferably a trimethylaluminum, triethylaluminum, tri-n-propylaluminum, tri-n-butylaluminum, triisobutylaluminum, trihexylaluminum, trioctylaluminum and the like. Among these, tri-n-butylaluminum, triisobutylaluminum and trihexylaluminum are preferred.

The amount of the carried trialkylaluminum compound is preferably such that the molar ratio of the trialkylaluminum compound to the chromium atom is 0.5 to 10, preferably 0.7 to 7, and more preferably 1 to 5. By adjusting the molar ratio to 0.5 to 10, the ethylene polymerization activity of the catalyst is increased greatly as compared with the case where no trialkylaluminum compound is carried on the carrier. If the molar ratio of the trialkylaluminum compound to the chromium atom is less than 0.5, the effect of carrying the trialkylaluminum compound is not obtained and the ethylene polymerization activity, ESCR and impact resistance do not differ from those observed where no trialkylaluminum compound is carried. If the molar ratio exceeds 10, the ethylene polymerization activity is lower and at the same time the molecular weight distribution is broader than those observed where no trialkylaluminum compound is carried, so that although ESCR is increased, the impact resistance is decreased to deteriorate the balance between ESCR and impact resistance. The reason why the activity decreases is not clarified yet but it is believed that excess trialkylaluminum compound is connected to chromium active sites to inhibit ethylene polymerization reaction.

The method for having trialkylaluminum compound carried to the carrier is not particularly limited as far as the chromium catalyst after the calcination-activation is contacted in a liquid phase of an inert hydrocarbon.

Preferred is, for example, a method of mixing the chromium catalyst after the calcination-activation with an inert hydrocarbon such as propane, n-butane, isobutane, n-pentane, isopentane, hexane, heptane, octane, decane, cyclohexane, benzene, toluene or xylene to convert the catalyst into a slurry state, and adding to this a trialkylaluminum compound.

The trialkylaluminum compound to be added may be diluted with the above-mentioned inert hydrocarbon solvent before it can be added or may be added without dilution. The solvent for dilution and the solvent for carrying may be the same or different.

The amount of the inert hydrocarbon solvent is preferably such an amount as sufficient for enabling stirring the mixture in a slurry state upon preparing the catalyst. In such an amount, the use amount of the solvent is not particularly limited. For example, 2 to 20 g of a solvent per 1 g of the chromium catalyst after the calcination-activation can be used.

In the present invention, the order of addition of the trialkylaluminum compound and the chromium catalyst when treating the chromium catalyst with the trialkylaluminum compound in the inert hydrocarbon solvent is optional. More specifically, the carrying reaction operation is preferred in which the chromium catalyst is suspended in an inert hydrocarbon solvent, a trialkylaluminum compound is added thereto and the resulting mixture is stirred.

The temperature of carrying reaction is 0 to 150° C., preferably 10 to 100° C., and more preferably 20 to 80° C., for 5 minutes to 8 hours, preferably 30 minutes to 6 hours, and more preferably 1 to 4 hours. The trialkylaluminum compound reacts with the chromium atoms that have been converted into hexavalent chromium atoms for at least a portion thereof by the calcination-activation to reduce them into chromium atoms with lower valences. This phenomenon can be confirmed by the fact that the chromium catalyst after the calcination-activation is orange in color while the chromium catalyst subjected to the carrying operation with the trialkylaluminum compound is green to bluish green. That is, the change in color suggests that hexavalent chromium atoms have been reduced to trivalent or divalent chromium atoms for at least a portion thereof.

After completion of the carrying operation by stopping the stirring, it is necessary that the solvent be quickly removed. The removal of the solvent is performed by drying under reduced pressure. In this case, filtration may be used in combination. In the drying under reduced pressure, the drying is performed such that the trialkylaluminum compound-carried chromium catalyst can be obtained as free flowing powder. If the catalyst is stored for a long time without having been separated from the solvent, the catalyst is deteriorated with lapse of time and the ethylene polymerization activity thereof is decreased. In addition, the molecular weight distribution is broader so that although ESCR is improved, the impact resistance is decreased. As a result, the balance between ESCR and impact resistance is not desirable. Therefore, the time in which the catalyst is contacted with the solvent including the time in which it is contacted with the solvent upon the carrying reaction is preferably as short as possible to quickly separate and remove the solvent. As far as is known there is no prior art literature that describes the effect of quick separation and removal of the solvent to give ethylene polymer with an improved balance between ESCR and impact resistance, and it is one of the most important feature of the present invention to quickly separate the solvent after the carrying reaction.

The reason why this effect is obtained is not clarified yet but it is believed that in the presence of solvents the reaction between the chromium active sites and the trialkylaluminum compound continues to proceed, with the result that the chromium atoms converted into hexavalent chromium atoms for a portion thereof by the calcination-activation in a non-reducing atmosphere are over-reduced and changed to have a catalyst structure that inhibits the ethylene polymerization reaction. However, it is difficult to specifically indicate the over-reduced state of chromium such as valence or the like of chromium in an over-reduced state. What is important is that the degree of over-reduction can be judged by a reduction in polymerization activity, a reduction in physical property of the resultant polymer, mainly a reduction in impact strength. Here, the term "impact strength" is meant specifically tensile impact strength. That is, if the time of contact with the solvent is too long, a reduction in polymerization activity, a reduction of in physical property of the resultant polymer, mainly a reduction in impact strength occurs. Therefore, the time of contact with the solvent by adding the time of contact with the solvent upon the carrying reaction is made as short as possible so that the polymerization activity or impact strength of the resultant polymer will not be reduced substantially or the degree of the reduction, if any, will be minimized. That is, the carrying reaction time, which is the time of contact with the solvent, must be made as short as possible and after the carrying, the solvent must be quickly separated in order to prevent the over-reduction reaction from proceeding. The time required for separating and drying the solvent after completion of the carrying reaction is preferably within 3 folds, preferably within 2 folds, and particularly within 1 fold, the carrying reaction time. The total time from the initiation of the carrying to the completion of the removal and drying of the solvent is from 5 minutes to 24 hours, preferably 30 minutes to 18 hours, and more preferably 1 to 12 hours.

The trialkylaluminum compound-carried chromium catalyst is preferably in a free flowing, non-viscous state. To give a rough standard for physical property, the residual mass of the solvent is $1/10$ or less, preferably $1/30$ or less, and more preferably $1/100$ or less of the mass obtained by multiplying the pore volume of the chromium catalyst by the density of the solvent. The pore volume is measured by the BET method by nitrogen adsorption and the residual mass of the solvent is obtained according to the following equation.

Residual mass of solvent=(mass of the trialkylaluminum compound-carried chromium catalyst after drying)−{(mass of the trialkylaluminum compound)+(mass of the chromium catalyst)}

When the trialkylaluminum compound is used in combination with the chromium catalyst, there are two possible methods. One is a method in which the chromium catalyst and the trialkylaluminum compound are directly or separately fed to the reactor in the presence or absence of solvents for dilution and another is a method in which the chromium catalyst and the trialkylaluminum compound are first premixed or contacted with each other in a solvent and then the mixed slurry is fed to the reactor. However, the both methods perform continuous production while feeding the chromium catalyst and the trialkylaluminum compound separately to the reactor and hence the amounts of the chromium catalyst and the trialkylaluminum compound continuously fed and the proportion of one to the other must be accurately controlled. Otherwise, the polymerization activity and molecular weight of the resultant ethylene polymer will vary so that it is difficult to produce articles of the same standard continuously.

According to the method of the present invention, the catalyst comprising a chromium catalyst having carried thereon a trialkylaluminum compound in advance so that the molar ratio of the trialkylaluminum compound to the chromium atom is always constant is fed to a reactor, so that articles of the same standard can be continuously produced stably. Therefore, the method of the present invention is an excellent method for continuously producing an ethylene polymer of a constant quality.

When producing an ethylene polymer using the trialkylaluminum compound-carried chromium catalyst mentioned above, any one of a liquid phase polymerization method such as a slurry polymerization method or a solution polymerization method and a gas phase polymerization method may be adopted.

The liquid phase polymerization method is performed usually in a hydrocarbon solvent. The hydrocarbon solvent that can be used include inert hydrocarbons such as propane, n-butane, isobutane, n-pentane, isopentane, hexane, heptane, octane, decane, cyclohexane, benzene, toluene, and xylene singly or in admixture.

For the gas phase polymerization method, commonly known polymerization methods such as a fluidized bed method and a stirred bed method may be used in the co-presence of an inert gas. A so-called condensing mode in which a medium for removing polymerization heat is co-present may be adopted as the case may be.

The polymerization temperature in the case of liquid phase or gas phase polymerization method is generally 0 to 300° C., practically 20 to 200° C., preferably 50 to 180° C., and more preferably 70 to 150° C. The concentration of the catalyst and that of ethylene in the reactor may be any desired concentrations that are sufficient for the polymerization to proceed. For example, the concentration of catalyst may be in the range of about 0.0001 to about 5 mass % based on the mass of the contents of the reactor. Similarly, the concentration of ethylene, in the case of gas phase polymerization, may be in the range of 0.1 to 10 MPa as total pressure.

In the present invention, in order to produce target ethylene polymers that have ESCR and impact resistance in good balance, in particular those suitable for blow molded articles, among others those for large size blow molded articles, it is indispensable that ethylene is polymerized in the co-presence of hydrogen. More particularly, hydrogen and ethylene must be polymerized under condition under which they are controlled in a specified ratio. Generally, hydrogen is said to have a function of so-called chain transfer agent for controlling the molecular weight of the resultant polymer. However, as far as is known no prior art has been found that has clearly indicated that polymerization of hydrogen and ethylene with controlling them to a specified ratio taking into consideration ethylene in addition to hydrogen gives rise to an improvement in the balance between ESCR and impact resistance. It is one of the most important features of the present invention that hydrogen and ethylene are polymerized under the condition under which they are controlled to a specified ratio to improve the balance between ESCR and impact resistance.

The reason why the co-presence of hydrogen gives rise to such an effect is not clarified yet but it is believed that this is attributable to the possibility that in the polymerization of ethylene using the trialkylaluminum compound-carried chromium catalyst, the co-presence of hydrogen has a function of introducing a long chain branch of a suitable length or in a suitable number to a specified molecular weight range or a function of varying the distribution of a short chain branch by copolymerization with an α-olefin.

In the case where the polymerization of ethylene is performed by the liquid phase polymerization method, the polymerization is performed under the condition under which the ratio of the concentration (mass %) of hydrogen in the liquid phase (hereinafter, abbreviated as "Hc") to the concentration (mass %) of ethylene in the liquid phase (hereinafter, abbreviated as "ETc") satisfies the relationship represented by the following formulas:

$$1.0 \times 10^{-6} \leq Hc/ETc \leq 1.0 \times 10^{-2},$$

preferably $$3.0 \times 10^{-6} \leq Hc/ETc \leq 8.0 \times 10^{-3},$$

and more preferably $$5.0 \times 10^{-6} \leq Hc/ETc \leq 5.0 \times 10^{-3}.$$

In the case of gas phase polymerization, the polymerization is performed under the condition under which the ratio of the partial pressure (MPa) of hydrogen (hereinafter, abbreviated as "Hp") to the partial pressure (MPa) of ethylene (hereinafter, abbreviated as "ETp") satisfies the following formulas:
ti $1.0 \times 10^{-4} \leq Hp/ETp \leq 1.0$, preferably $$3.0 \times 10^{-4} \leq Hp/ETp \leq 8.0 \times 10^{-1},$$

and more preferably $$5.0 \times 10^{-4} \leq Hp/ETp \leq 5.0 \times 10^{-1}.$$

The concentration ratio or partial pressure ratio of hydrogen to be co-present to ethylene can be controlled with ease by varying the concentrations or partial pressures of hydrogen and ethylene. As mentioned above, hydrogen also serves as a chain transfer agent and hence when Hc/ETc or Hp/ETp is changed, the polymerization temperature must also be changed in order to obtain articles of the same HLMFR. That is, when Hc/ETc or Hp/ETp is increased, the polymerization temperature must be decreased while when Hc/ETc or Hp/ETp is decreased, the polymerization temperature must be increased. However, this is governed by the absolute values of concentration or partial pressure of hydrogen, so that it is not always necessary that the polymerization temperature be varied in order to obtain articles of the same HLMFR.

If either Hc/ETc or Hp/ETp is less than the above ranges, the resultant ethylene polymer does not exhibit the effect of the co-presence of hydrogen on ESCR and impact resistance at the same HLMFR. On the other hand, if either Hc/ETc or Hp/ETp is more than the above ranges, the resultant ethylene polymer has a considerably decreased ethylene polymerization activity at the same HLMFR. Thus the Hc/ETc or Hp/ETp outside the above ranges are not preferable. In addition, the molecular weight distribution is broader so that although ESCR is improved, impact resistance is decreased and the balance between ESCR and impact resistance is aggravated.

The pressure of hydrogen is not particularly limited. Usually, it is in the range of $1.0 \times 10^{-5}$ to $1.0 \times 10^{-1}$ mass %, preferably $5.0 \times 10^{-4}$ to $5.0 \times 10^{-2}$ mass %, as the concentration of hydrogen in the liquid phase in the case of the liquid polymerization method, and it is in the range of $1.0 \times 10^{-3}$ to 10.0 MPa, preferably $5.0 \times 10^{-2}$ to 5.0 MPa as the partial pressure of hydrogen in the gas phase in the case of the gas phase polymerization method. The pressure of ethylene is not particularly limited. Usually, it is in the range of 1.0 to 20.0 mass %, preferably 2.0 to 15.0 mass %, as the concentration of ethylene in the liquid phase in the case of the liquid polymerization method, and it is in the range of 1.0 to 20.0 MPa, preferably 2.0 to 15.0 MPa as the partial pressure of ethylene in the gas phase in the case of the gas phase polymerization method.

When the polymerization of ethylene is performed using the trialkylaluminum compound-carried chromium catalyst by the method of the present invention, α-olefin is by-produced from ethylene and the α-olefin is further co-polymerized with ethylene. Therefore, use of ethylene as the monomer results in the production of a copolymer of ethylene and α-olefin. Although the mechanism in which α-olefin is by-produced is unclear yet, the fact that when no trialkylaluminum compound is carried on the carrier, substantially no α-olefin is by-produced suggests that the trialkylaluminum compound would convert a portion of the chromium activation sites to the active sites for by-production of α-olefin. The type of α-olefin by-produced includes 1-butene, 1-hexene, 1-octene and the like. In particular, 1-hexene is by-produced in a large amount. Therefore, the ethylene polymer obtained from ethylene alone contains short chain branches such as ethyl branches, n-butyl branches and n-hexyl branches, in particular n-butyl branches. According as the molar ratio of the trialkylaluminum compound to the chromium atom increases, the density of the obtained ethylene polymer tends to decrease and from this it follows that the amount of by-produced α-olefin increases according as the molar ratio increases. However, in the case where a desired density of ethylene polymer is not obtained with the by-produced α-olefin alone, one or more α-olefins such as propylene, 1-butene, 1-pentene, 1-hexene, 4-methyl-1-pentene, and 1-octene may be introduced for copolymerization as needed for controlling the density.

Here, in the present invention, the α-olefin content of the obtained ethylene polymer is desirably 15 mol % or less, preferably 10 mol % or less.

By the method of the present invention, ethylene polymers having an HLMFR (high load melt flow rate) of 0.1 to 1,000 g/10 minutes, preferably 0.5 to 500 g/10 minutes, and a density of 0.900 to 0.980 g/cm$^3$, preferably 0.920 to 0.970 g/cm$^3$ can be obtained. The obtained ethylene polymers have high ESCR and high impact resistance in an excellent balance so that they are highly effective for the production of blow molded articles, in particular large size molded articles. The HLMFR of the ethylene polymer for blow molded articles is 1 to 100 g/10 minutes, in particular 1 to 15 g/10 minutes in the case of the ethylene polymer for large size blow molded articles. The density of the ethylene polymer for blow molded articles is 0.935 to 0.960 g/cm³, in particular 0.940 to 0.955 g/cm³ in the case of the ethylene polymer for large size blow molded articles.

The ethylene polymer obtained by the method of the present invention, which is suitable for blow molded articles, has an ESCR of 190 (hr) or more and a impact resistance (tensile impact) of 180 (kJ/m²) or more, the values being measured by the measurement methods described hereinbelow, although such may vary depending on the HLMFR and density.

As the polymerization method, not only a single-step polymerization in which only one reactor is used for producing an ethylene polymer but also at least two reactors coupled to each other are used to perform a multi-step polymerization in order to broaden the molecular weight distribution. In the case of multi-step polymerization, it is preferred that two reactors be coupled to each other and the reaction mixture after the polymerization in the first step reactor be subsequently fed to the second step reactor. The transfer of the reaction mixture from the first step to the second step is performed through a coupling pipe by a difference in pressure generated by continuously discharge of the polymerization reaction mixture from the first step reactor.

The polymerization may be performed either by a method of producing a high molecular weight component in the first step reactor and a low molecular weight component in the second step reactor or by a method of producing a low molecular weight component in the first step reactor and a high molecular weight component in the second step reactor. However, the method of producing a high molecular weight component in the first step reactor and a low molecular weight component in the second step reactor is more preferable from the viewpoint of productivity since no intermediate flash tank for hydrogen is necessary in the transfer of the first step to the second step.

In the first step, polymerization reaction of ethylene alone or optionally copolymerization reaction of ethylene with α-olefin is performed while controlling the molecular weight by means of mass ratio or partial pressure ratio of the concentration of hydrogen to the concentration of ethylene (Hc/ETc or Hp/ETp), polymerization temperature or both, and also controlling the density by means of mass ratio or partial pressure ratio of the concentration of α-olefin to the concentration of ethylene.

In the second step, although there exist the hydrogen and α-olefin in the reaction mixture that flows in from the first step, optionally fresh hydrogen and α-olefin may be added.

Therefore, in the second step too, the polymerization reaction may be performed while controlling the molecular weight by means of mass ratio or partial pressure ratio of the concentration of hydrogen to the concentration of ethylene (Hc/ETc or Hp/ETp), polymerization temperature or both and also controlling the density by means of mass ratio or partial pressure ratio of the concentration of α-olefin to the concentration of ethylene. As for the catalyst or organometallic compound such as an organoaluminum compound, not only the polymerization is subsequently performed in the second step using the catalyst that flows in from the first step, but also the polymerization in the second step may be performed by freshly supplying the catalyst or organometallic compound such as an organoaluminum compound or both.

The ratios of the high molecular weight component and low molecular weight component produced by the two-step polymerization are 10 to 90 parts by mass of the high molecular weight component and 90 to 10 parts by mass of the low molecular weight component, preferably 20 to 80 parts by mass of the high molecular weight component and 80 to 20 parts by mass of the low molecular weight component, and more preferably 30 to 70 parts by mass of the high molecular weight component and 70 to 30 parts by mass of the low molecular weight component. The HLMFR of the high molecular weight component is 0.01 to 100 g/10 minutes, preferably 0.01 to 50 g/10 minutes, and MFR (value measured at a temperature of 190° C. and at a load of 21.18N according to Table 1, condition 4 of JIS K-7210 (1996 version)) of the low molecular weight component is 10 to 1,000 g/10 minutes, preferably 10 to 500 g/10 minutes.

The HLMFR of the ethylene polymer obtained by the two-step polymerization is 0.1 to 1,000 g/10 minutes, preferably 0.5 to 500 g/10 minutes. However, it is 1 to 100 g/10 minutes as a resin for blow molded articles, in particular 1 to 15 g/10 minutes as a resin for large size blow molded articles. The density of the ethylene polymer obtained by the two-step polymerization is 0.900 to 0.980 g/cm³, preferably 0.920 to 0.970 g/cm³. However, it is 0.935 to 0.960 g/cm³ as a resin for blow molded articles, in particular 0.940 to 0.955 g/cm³ as a resin for large size molded articles.

Preferably, the obtained ethylene polymer is kneaded. The kneading may be performed using a single screw or twin screw extruder or a continuous kneader.

The obtained ethylene polymer may be blow molded by a common method.

BEST MODE FOR CARRYING OUT THE INVENTION

Hereinafter, the present invention will be described in more detail by examples and comparative examples. However, the present invention should not be construed as being limited thereto. In the examples and comparative examples, the measurement methods used are as follows.

a) Quantitative Determination of Concentrations of Hydrogen and Ethylene in the Liquid Phase:

The concentration of hydrogen and that of ethylene in the liquid phase in the case of a liquid phase polymerization method were obtained according to JIS K-2301 (1992 version) by preliminarily analyzing and quantitatively determining the concentration of hydrogen and that of ethylene by gas chromatography under the conditions of the polymerization temperature, partial pressure of hydrogen and partial pressure of ethylene of each example or comparative example with introducing no catalyst. A small amount of the solution in the autoclave or reactor was extracted and evaporated. Using Gas Chromatograph GC-14A produced by Shimadzu Seisakusho, the concentrations of hydrogen and ethylene were determined on a thermal conductivity detector under analysis conditions prescribed in page 10, table 2, column combination B in the above-cited JIS.

b) Pretreatment of Polymer for the Measurement of Physical Properties:

Using Plastograph (Labo Plastomill ME25; the shape of roller is R608 type) produced by Toyo Seiki Seisakusho Co., Ltd., and after adding 0.2% of Irganox B225 produced by Ciba-Geigy as an additive, the polymer was kneaded at 190° C. for 7 minutes in a nitrogen atmosphere.

c) High Load Melt Flow Rate (HLMFR):

According to Table 1, condition 7 of JIS K-7210 (1996 version), measurements were made at 190° C. and at a load of 211.82 N. The obtained values were indicated as HLMFR.

d) Density:

This was measured according to JIS K-7112 (1996 version).

e) Molecular Weight Distribution (Mw/Mn):

Gel permeation chromatography (GPC) was performed on generated ethylene polymer under the following conditions and number average molecular weight (Mn) and weigh average molecular weight (Mw) were obtained.

[Gel Permeation Chromatography Measurement Conditions]

Apparatus: WATERS 150 C Model
Column: Shodex-HT806M
Solvent: 1,2,4-Trichlorobenzene
Temperature: 135° C.
Universal standardization using a monodisperse polystyrene fraction.

For the molecular weight distribution as indicated by the ratio of Mw to Mn (greater Mw/Mn indicates broader molecular weight distribution), data of n-alkanes and fractionated linear polyethylene of Mw/Mn≦1.2 were applied to the formula on molecular weight and detector sensitivity described in "Size Exclusion Chromatography (High Performance Liquid Chromatography for High Molecular Weight)" (S. Mori, Kyoritsu Shuppan, p. 96, 1992), to obtain the sensitivity of molecular weight M indicated by the following equation and correction of measured values of samples was made.

Sensitivity of Molecular Weight M=a+b/M (where a, b are constants; a=1.032, b=189.2)

f) Environment stress Crack Resistance (ESCR):

F50 values measured by BTL method according to JIS K-6760 (1996 version) were defined as ESCR (hr).

g) Tensile Impact:

Tensile impact (kJ/m$^2$) values measured at 23° C. according to ASTM D-1822 were defined as values of impact resistance.

EXAMPLE 1

(1) Preparation of a Chromium Catalyst

In a 500 ml beaker was charged 20 g of silica of CARiACT P-6 grade, produced by Fuji Silicia Co., Ltd. (specific surface are of 450 m$^2$/g, pore volume of 1.3 cm$^3$/g, mean particle size of 40 μm) and 50 ml of deionized water was added thereto to form a slurry. A solution of 0.40 g of anhydrous chromium trioxide (produced by Wako Pure Chemical Industry Co., Ltd.) in 10 ml of deionized water was added to this while stirring and the mixture was stirred for 1 hour at room temperature. The water was removed by decantation and the residue was dried for 12 hours in a constant temperature drier at 110° C. to remove the moisture. 15 g of the obtained powder was charged in a silica glass tube of 3 cm in diameter with a porous grating, which was set in a cylindrical electric oven for calcination and fluidized by air through molecular sieves at a flow rate of 1.0 l/minutes and calcination-activated at 600° C. for 18 hours. Thus, a chromium catalyst having an orange color indicating that it contains hexavalent chromium atoms was obtained. As a result of elemental analysis, the carrying amount of chromium atom was 1.01%. Using Sorptomatic SO 1990 produced by Fisons Instruments S. p. A., pretreatment was performed at 200° C. for 1 hour under vacuum, then the specific surface area of the catalyst was measured by a BET method by nitrogen adsorption (S. J. Gregg et al., Adsorption, Surface Area and Porosity, 2$^{nd}$ Edition, p. 42, Academic Press, 1982), which was 440 m$^2$/g.

(2) Trialkylaluminum Compound-carried Chromium Catalyst

In a 100 ml flask that had been preliminarily purged with nitrogen, 2 g of the chromium catalyst obtained in (1) above was charged and 30 ml of distillation purified hexane was added to form a slurry. 3.9 ml of a 0.1 mol/l hexane solution of tri-n-butylaluminum produced by Tosoh Akzo Co., Ltd. (Al/Cr molar ratio=1) was added thereto and the mixture was stirred at 40° C. for 2 hours. Immediately after completion of the stirring, the solvent was removed over 30 minutes under reduced pressure to obtain non-sticking, free flowing trialkylaluminum compound-carried chromium catalyst. The catalyst showed green color, which is an indication of the reduction of hexavalent chromium.

(3) Polymerization

In a sufficiently nitrogen purged 1.5-liter autoclave was charged 50 mg of the trialkylaluminum compound-carried chromium catalyst obtained in (2) above and 0.7 liters of isobutane and the inner temperature was elevated to 102° C. After introducing hydrogen to 0.1 MPa, 4 g of 1-hexene was introduced under pressure with ethylene. While maintaining the partial pressure of ethylene at 1.4 MPa (Hc/ETc=8.4×10$^{-4}$), polymerization was performed at 102° C. for 1 hour. Then, the content gases were discharged to the outside the reaction system to terminate the polymerization. As a result, 240 g of polyethylene was obtained. The polymerization activity per 1 g of catalyst per 1 hour of polymerization time was 4,800 g/g·hr. The results of measurements of physical properties (HLMFR, density, molecular weights (Mn, Mw), molecular weight distribution (Mw/Mn), ESCR, and tensile impact) are shown in Table 1.

EXAMPLE 2

The trialkylaluminum compound-carried chromium catalyst was prepared in the same manner as in Example 1 (2) except that 3.9 ml of 0.1 mol/l hexane solution of triethylaluminum produced by Tosoh Akzo Co., Ltd. (Al/Cr molar ratio=1) was used instead of tri-n-butylaluminum and polymerization was performed using the obtained catalyst. As a result, 220 g of polyethylene was obtained. The polymerization activity per 1 g of catalyst per 1 hour of polymerization time was 4,400 g/g·hr. The results of measurements of physical properties are shown in Table 1.

EXAMPLE 3

The trialkylaluminum compound-carried chromium catalyst was prepared in the same manner as in Example 1 (2) except that 3.9 ml of 0.1 mol/l hexane solution of triisobutylaluminum produced by Tosoh Akzo Co., Ltd. (Al/Cr molar ratio=1) was used instead of tri-n-butylaluminum and polymerization was performed using the obtained catalyst. As a result, 200 g of polyethylene was obtained. The polymerization activity per 1 g of catalyst per 1 hour of polymerization time was 4,000 g/g·hr. The results of measurements of physical properties are shown in Table 1.

EXAMPLE 4

The trialkylaluminum compound-carried chromium catalyst was prepared in the same manner as in Example 1 (2) except that 3.9 ml of 0.1 mol/l hexane solution of tri-n-hexylaluminum produced by Tosoh Akzo Co., Ltd. (Al/Cr molar ratio=1) was used instead of tri-n-butylaluminum and polymerization was performed using the obtained catalyst. As a result, 230 g of polyethylene was obtained. The polymerization activity per 1 g of catalyst per 1 hour of polymerization time was 4,600 g/g·hr. The results of measurements of physical properties are shown in Table 1.

15

EXAMPLE 5

The trialkylaluminum compound-carried chromium catalyst was prepared in the same manner as in Example 1 (2) except that the addition amount of 0.1 mol/l hexane solution of tri-n-butylaluminum was changed to 7.8 ml (Al/Cr molar ratio=2) and the polymerization was performed in the same manner as in Example 1 (3) except that the introduction amount of 1-hexene was changed to 1 g. As a result, 230 g of polyethylene was obtained. The polymerization activity per 1 g of catalyst per 1 hour of polymerization time was 4,600 g/g·hr. The results of measurements of physical properties are shown in Table 1.

EXAMPLE 6

The trialkylaluminum compound-carried chromium catalyst was prepared in the same manner as in Example 1 (2) except that the addition amount of 0.1 mol/l hexane solution of tri-n-butylaluminum was changed to 19.4 ml (Al/Cr molar ratio=5), and the polymerization was performed in the same manner as in Example 1 (3) except that the introduction amount of 1-hexene was changed to 0.2 g and the polymerization temperature was changed to 100° C. (Hc/ETc=8.1×10$^{-4}$). As a result, 130 g of polyethylene was obtained. The polymerization activity per 1 g of catalyst per 1 hour of polymerization time was 2,600 g/g·hr. The results of measurements of physical properties are shown in Table 1.

EXAMPLE 7

The trialkylaluminum compound-carried chromium catalyst was prepared in the same manner as in Example 1 (2) except that in Example (1) the temperature for the calcination-activation of the chromium catalyst was changed to 500° C. (the specific surface area of the resulting catalyst being 450 m$^2$/g by the BET method by nitrogen adsorption in the same manner as in Example 1 (1)) and this catalyst was used, and the polymerization was performed in the same manner as in Example 1 (3) except that the introduction amount of hydrogen was changed to 0.3 MPa, introduction amount of 1-hexene was changed to 3 g and the polymerization temperature was changed to 105° C. (Hc/ETc=2.7×10$^{-3}$). As a result, 160 g of polyethylene was obtained. The polymerization activity per 1 g of catalyst per 1 hour of polymerization time was 3,200 g/g·hr. The results of measurements of physical properties are shown in Table 1.

EXAMPLE 8

The trialkylaluminum compound-carried chromium catalyst was prepared in the same manner as in Example 1 (2) except that in Example (1) the temperature for the calcination-activation of the chromium catalyst was changed to 700° C. (the specific surface area of the resulting catalyst being 440 m$^2$/g by the BET method by nitrogen adsorption in the same manner as in Example 1 (1)) and this catalyst was used, and the polymerization was performed in the same manner as in Example 1 (3) except that the polymerization temperature was changed to 95° C. (Hc/ETc=7.6×10$^{-4}$). As a result, 2,200 g of polyethylene was obtained. The polymerization activity per 1 g of catalyst per 1 hour of polymerization time was 4,400 g/g·hr. The results of measurements of physical properties are shown in Table 1.

16

EXAMPLE 9

The polymerization was performed using the trialkylaluminum compound-carried chromium catalyst of Example 1(2) in the same manner as in Example 1 (3) except that the introduction amount of hydrogen was changed to 0.3 MPa, the introduction amount of 1-hexene was changed to 6 g, and the polymerization temperature was changed to 98° C. (Hc/ETc=7.9×10$^{-4}$). As a result, 210 g of polyethylene was obtained. The polymerization activity per 1 g of catalyst per 1 hour of polymerization time was 4,200 g/g·hr. The results of measurements of physical properties are shown in Table 1.

EXAMPLE 10

(1) Preparation of Chromium Catalyst

HA 30W catalyst (chromium carrying amount=1.0%, specific surface area of 500 m$^2$/g, pore volume of 1.5 cm$^3$/g, mean particle size of 70 μm) purchased from W.R. Grace Co. was calcination-activated at 600° C. for 18 hours in the same manner as in Example 1 (1). As a result of elemental analysis, the carrying amount of chromium atom was found to be 0.99%. Specific surface area measured by the BET method by nitrogen adsorption in the same manner as in Example 1 (1) was 420 m$^2$/g.

(2) Preparation of Trialkylaluminum-carried Chromium Catalyst

The trialkylaluminum-carried chromium catalyst was prepared in the same manner as in Example 1 (2) except that the catalyst obtained in (1) above was used as the catalyst and 3.8 ml of 0.1 mol/l hexane solution of tri-n-butylaluminum (Al/Cr molar ratio=1) was added. In the catalyst hexavalent chromium was reduced to present green color.

(3) Polymerization

The polymerization was performed in the same manner as in Example 1 (3) except that the trialkylaluminum compound-carried chromium catalyst obtained in (2) above was used. As a result, 250 g of polyethylene was obtained. The polymerization activity per 1 g of catalyst per 1 hour of polymerization time was 5,000 g/g·hr. The results of measurements of physical properties are shown in Table 1.

EXAMPLE 11

Gas Phase Polymerization

A vertical vibrating type reactor (volume of 150 cm$^3$, diameter of 50 mm, vibrating speed of 420 times/minutes (7 Hz), vibration distance of 6 cm) similar to the fluidized bed reactor described in G. Mabilon et al., Eur. Polym. J., Volume 21, p. 245, 1985 was fabricated and gas phase polymerization was performed therein.

In the reactor that had been preliminarily purged by nitrogen was put an ampoule enclosing 20 mg of the trialkylaluminum compound-carried chromium catalyst obtained in Example 1 (2) under nitrogen atmosphere, and heated to 104° C. Then, after introducing 0.017 MPa of hydrogen, 3 g of 1-hexene was introduced under pressure of 1.4 MPa of ethylene and vibration was started to crush the ampoule to initiate the polymerization.

To maintain the partial pressure of ethylene in the reactor at 1.4 MPa, ethylene was fed through a flexible joint (Hp/ETp=1.2×10$^{-2}$). After performing the polymerization at 105° C. for 15 minutes, the feed of ethylene was stopped and the reactor was cooled to room temperature, the gases were discharged and the content was taken out. As a result, 22 g of polyethylene was obtained. The polymerization activity per 1 g of catalyst per 1 hour of polymerization time was 4,400 g/g·hr. The results of measurements of physical properties are shown in Table 1.

17

EXAMPLE 12

Two-step Polymerization

In a first-step reactor having an inner volume of 200 liters was continuously supplied isobutane at a rate of 120 liter/hr and the trialkylaluminum compound-carried chromium catalyst obtained in Example 1 (2) at a rate of 5 g/hr, and ethylene, hydrogen and 1-hexene were supplied thereto at 101° C. such that the mass ratio (Hc/ETc) of the concentration of hydrogen to the concentration of ethylene in the liquid phase is maintained at $8.3 \times 10^{-4}$ and the mass ratio of the concentration of 1-hexene to the concentration of ethylene in the liquid phase is maintained at 0.13 while discharging the content in the reactor at a predetermined rate and the first step polymerization was continuously performed under the conditions of total pressure of 4.1 MPa, an average residence time of 0.9 hr in a liquid full state. Isobutane slurry containing the generated copolymer in the total amount was directly introduced into a second step reactor having an inner volume of 400 liters through a coupling pipe having an inner diameter of 50 mm and the second step polymerization was performed by supplying isobutane (55 liter/hr), ethylene and hydrogen (Hc/ETc=$8.5 \times 10^{-4}$) at 103° C. under the conditions of a total pressure of 4.1 MPa and an average residence time of 1.1 hr with adding no catalyst to obtain a polyethylene. The ratio of high molecular weight component in the first step was 47 parts by mass and the ratio of the low molecular weight component in the second step was 53 parts by mass. The polymerization activity per 1 g of catalyst per 1 hour of polymerization time in the first step was 5,200 g/g·hr and the polymerization per 1 g of catalyst per 1 hour of polymerization time in the second step was 4,700 g/g·hr. The results of measurements of physical properties are shown in Table 1.

Comparative Example 1

The polymerization was performed in the same manner as in Example 1 (3) except that the chromium catalyst in Example 1 (1) was used without carrying tri-n-butylaluminum and the introduction amount of 1-hexene was changed to 5 g. As a result, 130 g of polyethylene was obtained. The polymerization activity per 1 g of catalyst per 1 hour of polymerization time was 2,600 g/g·hr. The results of measurements of physical properties are shown in Table 1. As compared with Example 1, the activity was greatly reduced and the ESCR and impact resistance were poor.

Comparative Example 2

The polymerization was performed in the same manner as in Example 1 except that no hydrogen was introduced (Hc/ETc=0) and that the polymerization temperature was changed to 103° C. As a result, 235 g of polyethylene was obtained. The polymerization activity per 1 g of catalyst per 1 hour of polymerization time was 4,700 g/g·hr. The results of measurements of physical properties are shown in Table 1. As compared with Example 1, the ESCR and impact resistance were poor.

Comparative Example 3

(1) Preparation of Chromium Catalyst

A chromium catalyst was prepared and calcination-activated in the same manner as in Example 1 (1) except that P-10 grade silica produced by Fuji Silicia Co., Ltd. (specific surface are of 300 m²/g, pore volume of 1.5 cm³/g, mean particle size of 40 μm) was used instead of P-6 grade silica in Example 1 (1). As a result of elemental analysis, the carrying amount of chromium atom was found to be 0.98%. Specific surface area measured by the BET method by nitrogen adsorption in the same manner as in Example 1 (1) was 290 m²/g.

18

(2) Preparation of Trialkylaluminum-carried Chromium Catalyst

The trialkylaluminum-carried chromium catalyst was prepared in the same manner as in Example 1 (2) except that the catalyst obtained in (1) above was used as the catalyst and 18.8 ml of 0.1 mol/l hexane solution of tri-n-butylaluminum (Al/Cr molar ratio=5) was added. In the catalyst hexavalent chromium was reduced to present green color.

(3) Polymerization

The polymerization was performed in the same manner as in Example 1 (3) except that the trialkylaluminum compound-carried chromium catalyst obtained in (2) above was used and that the introduction amount of 1-hexene was changed to 0.2 g and the polymerization temperature was changed to 96° C. As a result, 25 g of polyethylene was obtained. The polymerization activity per 1 g of catalyst per 1 hour of polymerization time was 500 g/g·hr. The results of measurements of physical properties are shown in Table 1. As compared with Example 6, the activity was decreased greatly, the molecular weight distribution (Mw/Mn) was broad and the ESCR was slightly improved as compared with Comparative Examples 1 and 2 but the impact resistance was poor as compared with Example 6.

Comparative Example 4

The trialkylaluminum compound-carried chromium catalyst was prepared in the same manner as in Example 1 (2) except that the addition amount of the 0.1 mol/l hexane solution of tri-n-butylaluminum was changed to 0.78 ml (Al/Cr molar ratio=0.2), and the polymerization was performed in the same manner as in Example 1 (3) except that the polymerization temperature was changed to 103° C. (Hc/ETc=$8.5 \times 10^{-4}$). As a result, 155 g of polyethylene was obtained. The polymerization activity per 1 g of catalyst per 1 hour of polymerization time was 3,100 g/g·hr. The results of measurements of physical properties are shown in Table 1. As compared with Comparative Example 1, the activity was slightly improved but the ESCR and impact resistance were poor as compared with Example 1.

Comparative Example 5

The trialkylaluminum compound-carried chromium catalyst was prepared in the same manner as in Example 1 (2) except that 5.8 ml of 1.0 ml/l hexane solution of tri-n-butylaluminum (Al/Cr molar ratio=15) was added instead of 3.9 ml of the 0.1 mol/l hexane solution, and the polymerization was performed in the same manner as in Example 1 (3) except that the introduction amount of 1-hexene was changed to 0.2 g and the polymerization temperature was changed to 90° C. (Hc/ETc=$7.0 \times 10^{-4}$). As a result, 30 g of polyethylene was obtained. The polymerization activity per 1 g of catalyst per 1 hour of polymerization time was 600 g/g·hr. The results of measurements of physical properties are shown in Table 1. As compared with Example 1, the activity was greatly reduced, the molecular weight distribution was broad, the ESCR were slightly improved as compared with Comparative Examples 1 and 2 but the impact resistance was poor as compared with Example 1.

Comparative Example 6

In a sufficiently nitrogen purged 1.5-liter autoclave was charged 50 mg of the trialkylaluminum compound-carried chromium catalyst obtained in Example 1 (1) and 0.7 liters of isobutane, and the inner temperature was elevated to 100° C. After introducing hydrogen to 0.1 MPa, 0.49 ml of 0.1 mol/l hexane solution of tri-n-butylaluminum (Al/Cr molar ratio=5) and 0.2 g of 1-hexene were introduced under pressure with ethylene. While maintaining the partial pressure of ethylene at 1.4 MPa (Hc/ETc=8.1×10$^{-4}$), polymerization was performed at 100° C. in the same manner as in Example 1 (3). As a result, 60 g of polyethylene was obtained. The polymerization activity per 1 g of catalyst per 1 hour of polymerization time was 1,200 g/g·hr. The results of measurements of physical properties are shown in Table 1. As compared with Example 6, the activity was decreased and the molecular weight distribution (Mw/Mn) was broad. Although the ESCR was improved as compared with Comparative Examples 1 and 2, the impact resistance was poor as compared with Example 6.

Comparative Example 7

The polymerization was performed using the trialkylaluminum compound-carried chromium catalyst of Example 1(2) in the same manner as in Example 1 (3) except that hydrogen was introduced from a micro hydrogen tank in a minute amount such that the Hc/ETc=8.1×10$^{-7}$ at an ethylene partial pressure of 1.4 MPa. As a result, 245 g of polyethylene was obtained. The polymerization activity per 1 g of catalyst per 1 hour of polymerization time was 4,900 g/g·hr. The results of measurements of physical properties are shown in Table 1. As compared with Comparative Example 2, the activity, ESCR and impact resistance were not changed. The ESCR and impact resistance were poor as compared with Example 1.

Comparative Example 8

The polymerization was performed using the trialkylaluminum compound-carried chromium catalyst of Example 1(2) in the same manner as in Example 1 (3) except that the introduction amount of hydrogen was changed to 1.5 MPa (Hc/ETc =1.3×10$^{-2}$), the polymerization temperature was changed to 95° C., and the addition amount of 1-hexene was changed to 6 g. As a result, 145 g of polyethylene was obtained. The polymerization activity per 1 g of catalyst per 1 hour of polymerization time was 2,900 g/g·hr. The results of measurements of physical properties are shown in Table 1. As compared with Example 1, the activity was decreased and the molecular weight distribution (Mw/Mn) was broad. Although the ESCR was slightly improved as compared with Comparative Examples 1 and 2 but the impact resistance was poor as compared with Example 1.

Comparative Example 9

The polymerization was performed in the same manner as in Example 1 (3) except that the HA30W catalyst calcination-activated in Example 10 (1) was used and the addition amount of 1-hexene was changed to 5 g. As a result, 125 g of polyethylene was obtained. The polymerization activity per 1 g of catalyst per 1 hour of polymerization time was 2,500 g/g·hr. The results of measurements of physical properties are shown in Table 1. As compared with Example 10, the activity was decreased greatly and the ESCR and impact resistance were poor.

Comparative Example 10

The polymerization was performed in the same manner as in Example 1 (3) except that the HA30W catalyst calcination-activated in Example 10 (1) was used and that no hydrogen was introduced (Hc/ETc=0) and the polymerization temperature was changed to 103° C. As a result, 240 g of polyethylene was obtained. The polymerization activity per 1 g of catalyst per 1 hour of polymerization time was 4,800 g/g·hr. The results of measurements of physical properties are shown in Table 1. As compared with Example 10, the ESCR and impact resistance were poor.

Comparative Example 11

(1) Preparation of Chromium Catalyst

969ID catalyst (chromium carrying amount=1.0%, specific surf ace area of 310 m$^2$ g, pore volume of 1.2 cm$^3$/g, mean particle size of 80 μm) purchased from W.R. Grace Co. was calcination-activated at 600° C. for 18 hours in the same manner as in Example 1 (1). As a result of elemental analysis, the carrying amount of chromium atom was found to be 1.02%. Specific surface area measured by the BET method by nitrogen adsorption in the same manner as in Example 1 (1) was 280 m$^2$/g.

(2) Preparation of Trialkylaluminum-carried Chromium Catalyst

The trialkylaluminum-carried chromium catalyst was prepared in the same manner as in Example 1 (2) except that the catalyst obtained in (1) above was used as the catalyst and 3.9 ml of 0.1 mol/l hexane solution of tri-n-butylaluminum (Al/Cr molar ratio=1) was added. In the catalyst hexavalent chromium was reduced to present green color.

(3) Polymerization

The polymerization was performed in the same manner as in Example 1 (3) except that the trialkylaluminum compound-carried chromium catalyst obtained in (2) above was used and the polymerization temperature was changed to 100° C. (Hc/ETc=8.1×10$^{-4}$). As a result, 120 g of polyethylene was obtained. The polymerization activity per 1 g of catalyst per 1 hour of polymerization time was 2,400 g/g·hr. The results of measurements of physical properties are shown in Table 1. As compared with Example 1, the activity was decreased greatly and the ESCR and impact resistance were poor.

Comparative Example 12

In Example 1 (2), tri-n-butylaluminum was added and after stirring at 40° C. for 2 hours, the mixture in a slurry state was left to stand as it was at room temperature for 96 hours, the solvent was removed under reduced pressure to obtain non-sticking, free flowing trialkylaluminum compound-carried chromium catalyst. The polymerization was performed in the same manner as in Example 1 (3) except that this catalyst was used. As a result, 135 g of polyethylene was obtained. The polymerization activity per 1 g of catalyst per 1 hour of polymerization time was 2,700 g/g·hr. The results of measurements of physical properties are shown in Table 1. As compared with Example 1, the activity was decreased and the molecular weight distribution (Mw/Mn) was broad. Although the ESCR was slightly improved as compared with Comparative Examples 1 and 2, the impact resistance was poor as compared with Example 1.

Comparative Example 13

A carried-catalyst was prepared in the same manner as in Example 1 (2) except that 3.9 ml of 0.1 mol/l hexane solution of diethylaluminum ethoxide produced by Tosoh Akzo Co., Ltd. (Al/Cr molar ratio=1) was added instead of tri-n-butylaluminum, and the polymerization was performed in the same manner as in Example 1 (3) except that this catalyst was used and that the polymerization temperature was changed to 100° C. and the introduction amount of 1-hexene was changed to 5 g. As a result, 160 g of polyethylene was obtained. The polymerization activity per 1 g of catalyst per 1 hour of polymerization time was 3,200 g/g·hr. The results of measurements of physical properties are shown in Table 1. As compared with Example 1, the activity was decreased and the molecular weight distribution (Mw/Mn) was broad. Although the ESCR was slightly improved as compared with Comparative Examples 1 and 2, the impact resistance was poor as compared with Example 1.

Comparative Example 14

A carried-catalyst was prepared in the same manner as in Example 1 (2) except that 3.9 ml of 0.1 mol/l hexane solution of dibutylmagnesium produced by Aldrich Co. (Al/Cr molar ratio=1) was added instead of tri-n-butylaluminum, and the polymerization was performed in the same manner as in Example 1 (3) except that this catalyst was used and that the introduction amount of 1-hexene was changed to 4.5 g. As a result, 165 g of polyethylene was obtained. The polymerization activity per 1 g of catalyst per 1 hour of polymerization time was 3,300 g/g·hr. The results of measurements of physical properties are shown in Table 1. As compared with Example 1, the activity was decreased and the ESCR was poor.

Comparative Example 15

A carried-catalyst was prepared in the same manner as in Example 1 (2) except that 3.9 ml of 0.1 mol/l hexane solution of isobutylalumoxane (PBAO) produced by Tosoh Akzo Co., Ltd. (Al/Cr molar ratio=1) was added instead of tri-n-butylaluminum, and the polymerization was performed in the same manner as in Example 1 (3) except that this catalyst was used and that the introduction amount of 1-hexene was changed to 4.5 g. As a result, 160 g of polyethylene was obtained. The polymerization activity per 1 g of catalyst per 1 hour of polymerization time was 3,200 g/g·hr. The results of measurements of physical properties are shown in Table 1. As compared with Example 1, the activity was decreased and the ESCR was poor.

Comparative Example 16

In a sufficiently nitrogen purged 1.5-liter autoclave were charged 0.7 liters of isobutane, 0.49 ml of 0.1 mol/l hexane solution of tri-n-butylaluminum and 0.2 g of 1-hexene. After elevating the inner temperature to 100° C., ethylene and hydrogen were introduced and the partial pressure of ethylene was adjusted to 1.4 MPa and the partial pressure of hydrogen was adjusted to 0.1 MPa (Hp/ETp=8.1×10$^{-4}$). Then, 50 mg of the chromium catalyst (Al/Cr molar ratio=5) obtained in Example 1 (1) was introduced under pressure with nitrogen to initiate polymerization. While maintaining the partial pressure of ethylene at 1.4 MPa the polymerization was performed at 100° C. for 1 hour. As a result, 53 g of polyethylene was obtained. The polymerization activity per 1 g of catalyst per 1 hour of polymerization time was 1,060 g/g·hr. The results of measurements of physical properties are shown in Table 1. As compared with Example 6, the activity was decreased and the molecular weight distribution (Mw/Mn) was broad. Although the ESCR was improved as compared with Comparative Examples 1 and 2, the impact resistance was poor as compared with Example 6.

TABLE 1

| | Activation Catalyst Composition | Calcination Surface Temperature (° C.) | Specific Trialkyl-Area (m²/g) | aluminum Type | Al/Cr Molar Ratio |
|---|---|---|---|---|---|
| Example 1 | P-6/CrO$_3$ | 600 | 440 | n-Bu$_3$Al | 1 |
| Example 2 | P-6/CrO$_3$ | 600 | 440 | Et$_3$Al | 1 |
| Example 3 | P-6/CrO$_3$ | 600 | 440 | i-Bu$_3$Al | 1 |
| Example 4 | P-6/CrO$_3$ | 600 | 440 | n-Hx$_3$Al | 1 |
| Example 5 | P-6/CrO$_3$ | 600 | 440 | n-Bu$_3$Al | 2 |
| Example 6 | P-6/CrO$_3$ | 600 | 440 | n-Bu$_3$Al | 5 |
| Example 7 | P-6/CrO$_3$ | 500 | 450 | n-Bu$_3$Al | 1 |
| Example 8 | P-6/CrO$_3$ | 700 | 440 | n-Bu$_3$Al | 1 |
| Example 9 | P-6/CrO$_3$ | 600 | 440 | n-Bu$_3$Al | 1 |
| Example 10 | HA30W | 600 | 420 | n-Bu$_3$Al | 1 |
| Example 11 | P-6/CrO$_3$ | 600 | 440 | n-Bu$_3$Al | 1 |
| Example 12 | P-6/CrO$_3$ | 600 | 440 | n-Bu$_3$Al | 1 |
| Comparative Example 1 | P-6/CrO$_3$ | 600 | 440 | — | 0 |
| Comparative Example 2 | P-6/CrO$_3$ | 600 | 440 | n-Bu$_3$Al | 1 |
| Comparative Example 3 | P-10/CrO$_3$ | 600 | 290 | n-Bu$_3$Al | 5 |
| Comparative Example 4 | P-6/CrO$_3$ | 600 | 440 | n-Bu$_3$Al | 0.2 |
| Comparative Example 5 | P-6/CrO$_3$ | 600 | 440 | n-Bu$_3$Al | 15 |
| Comparative Example 6 | P-6/CrO$_3$ | 600 | 440 | n-Bu$_3$Al | 5 |
| Comparative Example 7 | P-6/CrO$_3$ | 600 | 440 | n-Bu$_3$Al | 1 |
| Comparative Example 8 | P-6/CrO$_3$ | 600 | 440 | n-Bu$_3$Al | 1 |
| Comparative Example 9 | HA30W | 600 | 420 | — | 0 |
| Comparative Example 10 | HA30W | 600 | 420 | n-Bu$_3$Al | 1 |

TABLE 1-continued

| | | | | | |
|---|---|---|---|---|---|
| Comparative Example 11 | 969ID | 600 | 280 | n-Bu$_3$Al | 1 |
| Comparative Example 12 | P-6/CrO$_3$ | 600 | 440 | n-Bu$_3$Al | 1 |
| Comparative Example 13 | P-6/CrO$_3$ | 600 | 440 | Et$_2$Al(OEt) | 1 |
| Comparative Example 14 | P-6/CrO$_3$ | 600 | 440 | Bu$_2$Mg | 1 |
| Comparative Example 15 | P-6/CrO$_3$ | 600 | 440 | PBAO | 1 |
| Comparative Example 16 | P-6/CrO$_3$ | 600 | 440 | n-Bu$_3$Al | 5 |

| | Hydrogen Partial Pressure (MPa) | Hc/ETc (or Hp/ETp) | Polymerization Temperature (° C.) | Addition Amount of 1-Hexene (g) | Other Conditions |
|---|---|---|---|---|---|
| Example 1 | 0.1 | $8.4 \times 10^{-4}$ | 102 | 4 | |
| Example 2 | 0.1 | $8.4 \times 10^{-4}$ | 102 | 4 | |
| Example 3 | 0.1 | $8.4 \times 10^{-4}$ | 102 | 4 | |
| Example 4 | 0.1 | $8.4 \times 10^{-4}$ | 102 | 4 | |
| Example 5 | 0.1 | $8.4 \times 10^{-4}$ | 102 | 1 | |
| Example 6 | 0.1 | $8.1 \times 10^{-4}$ | 100 | 0.2 | |
| Example 7 | 0.3 | $2.7 \times 10^{-3}$ | 105 | 3 | |
| Example 8 | 0.1 | $7.6 \times 10^{-4}$ | 95 | 4 | |
| Example 9 | 0.3 | $7.9 \times 10^{-4}$ | 98 | 6 | |
| Example 10 | 0.1 | $8.4 \times 10^{-4}$ | 102 | 4 | |
| Example 11 | 0.017 | $1.2 \times 10^{-2}$* | 105 | 3 | Gas phase polymerization |
| Example 12 | | 1$^{st}$ step $8.3 \times 10^{-4}$ 2$^{nd}$ step $8.5 \times 10^{-4}$ | 1$^{st}$ step 101 2$^{nd}$ step 103 | 1-Hexene/ Ethylene Mass Ratio = 0.13 | Two-step polymerization |
| Comparative Example 1 | 0.1 | $8.4 \times 10^{-4}$ | 102 | 5 | |
| Comparative Example 2 | 0 | 0 | 103 | 4 | |
| Comparative Example 3 | 0.1 | $8.1 \times 10^{-4}$ | 96 | 0.2 | |
| Comparative Example 4 | 0.1 | $8.5 \times 10^{-4}$ | 103 | 4 | |
| Comparative Example 5 | 0.1 | $7.0 \times 10^{-4}$ | 90 | 0.2 | |
| Comparative Example 6 | 0.1 | $8.1 \times 10^{-4}$ | 100 | 0.2 | Trialkylaluminum was added upon polymerization |
| Comparative Example 7 | | $8.1 \times 10^{-4}$ | 102 | 4 | |
| Comparative Example 8 | 1.5 | $1.3 \times 10^{-2}$ | 95 | 6 | |
| Comparative Example 9 | 0.1 | $8.4 \times 10^{-4}$ | 102 | 5 | |
| Comparative Example 10 | 0 | 0 | 103 | 4 | |
| Comparative Example 11 | 0.1 | $8.1 \times 10^{-4}$ | 100 | 4 | |
| Comparative Example 12 | 0.1 | $8.4 \times 10^{-4}$ | 102 | 4 | Catalyst was left to stand for 96 hr without drying immediately. |
| Comparative Example 13 | 0.1 | $8.4 \times 10^{-4}$ | 100 | 5 | |
| Comparative Example 14 | 0.1 | $8.4 \times 10^{-4}$ | 102 | 4.5 | |
| Comparative Example 15 | 0.1 | $8.4 \times 10^{-4}$ | 102 | 4.5 | |
| Comparative Example 16 | 0.1 | $8.1 \times 10^{-4}$ | 100 | 0.2 | Catalyst and tri-alkylaluminum were contacted in the reaction mixture. |

| | Activity (g/g · hr) | HLMFR (g/10 min) | Density (g/cm$^3$) | Mn (× 10$^4$) | Mw (× 10$^4$) | Mw/ Mn | ESCR (hr) | Tensile Impact (kJ/m$^2$) |
|---|---|---|---|---|---|---|---|---|
| Example 1 | 4800 | 6.0 | 0.944 | 2.0 | 34.8 | 17.4 | 240 | 220 |
| Example 2 | 4400 | 6.1 | 0.944 | 2.1 | 35.2 | 16.8 | 230 | 210 |
| Example 3 | 4000 | 6.1 | 0.943 | 1.9 | 35.1 | 18.5 | 240 | 210 |

TABLE 1-continued

| | | | | | | | | |
|---|---|---|---|---|---|---|---|---|
| Example 4 | 4600 | 6.3 | 0.943 | 2.1 | 35.3 | 16.8 | 260 | 230 |
| Example 5 | 4600 | 5.9 | 0.944 | 2.2 | 36.0 | 16.4 | 250 | 230 |
| Example 6 | 2600 | 6.3 | 0.943 | 2.1 | 35.5 | 16.9 | 260 | 220 |
| Example 7 | 3200 | 6.2 | 0.945 | 1.8 | 35.8 | 19.9 | 300 | 190 |
| Example 8 | 4400 | 6.4 | 0.944 | 2.8 | 35.6 | 12.7 | 200 | 260 |
| Example 9 | 4200 | 5.8 | 0.945 | 2.3 | 36.3 | 15.8 | 220 | 220 |
| Example 10 | 5000 | 6.2 | 0.944 | 2.1 | 35.6 | 17.0 | 240 | 210 |
| Example 11 | 4400 | 5.8 | 0.945 | 2.5 | 35.5 | 14.2 | 210 | 230 |
| Example 12 | 1st step 5200 2nd step 4700 | 5.8 | 0.946 | 1.9 | 36.8 | 19.4 | 280 | 230 |
| Comparative Example 1 | 2600 | 5.9 | 0.944 | 2.2 | 35.8 | 16.3 | 140 | 160 |
| Comparative Example 2 | 4700 | 5.5 | 0.943 | 2.3 | 36.7 | 16.0 | 150 | 160 |
| Comparative Example 3 | 500 | 5.3 | 0.945 | 1.5 | 35.6 | 23.7 | 200 | 140 |
| Comparative Example 4 | 3100 | 5.8 | 0.943 | 2.2 | 35.9 | 16.3 | 140 | 160 |
| Comparative Example 5 | 600 | 6.0 | 0.944 | 1.2 | 36.2 | 30.2 | 220 | 120 |
| Comparative Example 6 | 1200 | 6.1 | 0.944 | 1.5 | 36.0 | 24.0 | 200 | 140 |
| Comparative Example 7 | 4900 | 5.6 | 0.944 | 2.3 | 36.8 | 16.0 | 150 | 160 |
| Comparative Example 8 | 2900 | 6.5 | 0.945 | 1.6 | 34.5 | 21.2 | 190 | 130 |
| Comparative Example 9 | 2500 | 5.7 | 0.944 | 2.2 | 36.3 | 16.5 | 140 | 150 |
| Comparative Example 10 | 4800 | 5.8 | 0.944 | 2.1 | 36.0 | 17.1 | 150 | 160 |
| Comparative Example 11 | 2400 | 6.0 | 0.945 | 2.1 | 35.0 | 16.7 | 140 | 140 |
| Comparative Example 12 | 2700 | 6.1 | 0.943 | 1.4 | 36.2 | 25.9 | 210 | 130 |
| Comparative Example 13 | 3200 | 5.9 | 0.944 | 1.6 | 35.1 | 21.9 | 200 | 140 |
| Comparative Example 14 | 3300 | 6.1 | 0.944 | 2.1 | 35.8 | 17.0 | 190 | 220 |
| Comparative Example 15 | 3200 | 6.0 | 0.944 | 2.0 | 35.2 | 17.6 | 190 | 220 |
| Comparative Example 16 | 1060 | 6.0 | 0.944 | 1.4 | 36.2 | 25.9 | 210 | 130 |

P-6: Silica (specific surface area of 450 m$^2$/g, pore volume of 1.3 cm$^3$/g, mean particle size of 40 μm)
HA30W: Chromium catalyst (chromium carrying amount = 1.0%, specific surface area of 500 m$^2$/g, pore volume of 1.5 cm$^3$/g, mean particle size of 70 μm)
P-10: Silica (specific surface area of 300 m$^2$/g, pore volume of 1.5 m$^3$/g, mean particle size of 40 μm)
969ID: Phillips catalyst (chromium carrying amount = 1.0%, specific surface area of 310 m$^2$/g, pore volume of 1.2 cm$^3$/g, mean particle size of 80 μm)
PBAO: Isobutylalumoxane
*indicates Hp/Etp value, and others indicate Hc/ETc values.

INDUSTRIAL APPLICABILITY

By performing polymerization, preferably continuous polymerization, of ethylene in the co-presence of hydrogen using a catalyst obtained by having a trialkylaluminum compound carried on a chromium catalyst in an inert hydrocarbon solvent and removing and drying the solvent in accordance with the method of the present invention, ethylene polymers improved in both environment stress crack resistance and impact resistance in good balance can be produced.

The ethylene polymers obtained by the method of the present invention are featured by being simultaneously improved in both ESCR and impact resistance, which are contradictory to each other. They find their application particularly as a molding material that is suitable for blow molded articles, in particular large size blow molded articles.

What is claimed is:

1. A method for producing an ethylene polymer, comprising performing polymerization of ethylene in the co-presence of hydrogen using a trialkylaluminum compound-carried chromium catalyst, wherein the chromium catalyst is obtained by calcination-activating a chromium compound that is carried on an inorganic oxide carrier in a non-reducing atmosphere to convert chromium atoms in the chromium compound into hexavalent chromium atoms for at least a portion thereof, and treating with a trialkylaluminum compound in an inert hydrocarbon solvent to carry thereon and removing the solvent therefrom so that the chromium atoms are not over-reduced by the trialkylaluminum compound.

2. A method for producing an ethylene polymer, comprising performing polymerization of ethylene in the co-presence of hydrogen using a trialkylaluminum compound-carried chromium catalyst, wherein the chromium catalyst is obtained by calcination-activating a chromium compound that is carried on an inorganic oxide carrier in a non-reducing atmosphere to convert chromium atoms in the chromium compound into hexavalent chromium atoms for at least a portion thereof, and treating with a trialkylaluminum compound in an inert hydrocarbon solvent to carry thereon and removing the solvent therefrom so that a time in which the chromium compound contacts the solvent is minimized.

3. The method for producing an ethylene polymer as claimed in claim 1 or 2, wherein the inert hydrocarbon solvent is removed in a time within 3 folds a time in which the carrying reaction of trialkylaluminum compound in the inert hydrocarbon solvent is performed.

4. The method for producing an ethylene polymer as claimed in claim 1 or 2, wherein the chromium compound-carried inorganic oxide carrier after the calcination-activation has a specific surface area of 350 m$^2$/g or more.

5. The method for producing an ethylene polymer as claimed in claim 1 or 2, wherein the trialkylaluminum compound-carried chromium catalyst has a molar ratio of the trialkylaluminum compound to the chromium atom of 0.5 to 10.

6. The method for producing an ethylene polymer as claimed in claim 1 or 2, wherein the polymerization is performed in a liquid phase under the condition under which a ratio of hydrogen concentration (Hc; mass %) to ethylene concentration (ETc; mass %) in the liquid phase satisfies the following formula:

$$1.0\times10^{-6} \leq Hc/ETc \leq 1.0\times1.0^{-2}.$$

7. The method for producing an ethylene polymer as claimed in claim 1 or 2, wherein the polymerization is performed in a gas phase under the condition under which a ratio of partial pressure of hydrogen (Hp; MPa) to ethylene partial pressure (ETp; MPa) in the gas phase satisfies the following formula:

$$1.0\times10^{-4} \leq Hp/ETp \leq 1.0.$$

8. The method for producing an ethylene polymer as claimed in claim 1 or 2, wherein the time from the initiation of treating with a trialkylaluminum compound to the completion of the removal of the inert hydrocarbon solvent is from 5 minutes to 24 hours.

9. The method for producing an ethylene polymer as claimed in claim 8, wherein the inert hydrocarbon solvent is removed in a time within 3 folds a time in which treating with a trialkylaluminum compound in the inert hydrocarbon solvent is performed.

10. The method for producing an ethylene polymer as claimed in claim 8, wherein the chromium compound-carried inorganic oxide carrier after the calcination-activation has a specific surface area of 350 m$^2$/g or more.

11. The method for producing an ethylene polymer as claimed in claim 8, wherein the trialkylaluminum compound-carried chromium catalyst has a molar ratio of the trialkylaluminum compound to the chromium atom of from 0.5 to 10.

12. The method for producing an ethylene polymer as claimed in claim 8, wherein the polymerization is performed in a liquid phase in which a ratio of hydrogen concentration (Hc; mass %) to ethylene concentration (ETc; mass %) in the liquid phase satisfies the following formula:

$$1.0\times10^{6} \leq Hc/ETc \leq 1.0\times10^{-2}.$$

13. The method for producing an ethylene polymer as claimed in claim 8, wherein the polymerization is performed in a gas phase in which a ratio of partial pressure of hydrogen (Hp; MPa) to ethylene partial pressure (ETp; MPa) in the gas phase satisfies the following formula:

$$1.0\times10^{4} \leq Hp/ETp \leq 1.0.$$

* * * * *